US006871054B2

United States Patent
Kenkel et al.

(10) Patent No.: US 6,871,054 B2
(45) Date of Patent: *Mar. 22, 2005

(54) METHOD AND APPARATUS FOR PREDICTABLY SWITCHING DIVERSITY ANTENNAS ON SIGNAL DROPOUT

(75) Inventors: Mark A. Kenkel, Schaumburg, IL (US); Edgar C. Reihl, Northbrook, IL (US)

(73) Assignee: Shure Incorporated, Evanston, IL (US)

( * ) Notice: Subject to any disclaimer, the term of this patent is extended or adjusted under 35 U.S.C. 154(b) by 739 days.

This patent is subject to a terminal disclaimer.

(21) Appl. No.: 09/833,362

(22) Filed: Apr. 12, 2001

(65) Prior Publication Data

US 2001/0046848 A1 Nov. 29, 2001

Related U.S. Application Data

(63) Continuation of application No. 09/304,972, filed on May 4, 1999.

(51) Int. Cl.[7] .............................. H04B 1/06; H04B 7/00
(52) U.S. Cl. .................... 455/277.1; 455/272; 455/269
(58) Field of Search ............................ 455/277.1, 272, 455/269, 277.2, 249.1, 275, 133–136, 273, 140, 131, 132, 234.1, 234.2, 276.1; 333/100, 101, 17.1

(56) References Cited

U.S. PATENT DOCUMENTS

| | | | | |
|---|---|---|---|---|
| 5,263,180 A | * | 11/1993 | Hirayama et al. | 455/139 |
| 5,697,075 A | * | 12/1997 | Kim | 455/133 |
| 5,697,083 A | * | 12/1997 | Sano | 455/276.1 |
| 5,710,995 A | * | 1/1998 | Akaiwa et al. | 455/277.2 |
| 5,940,452 A | * | 8/1999 | Rich | 375/347 |
| 6,018,651 A | * | 1/2000 | Bruckert et al. | 455/277.1 |
| 6,023,615 A | * | 2/2000 | Bruckert et al. | 348/14.08 |
| 6,115,591 A | * | 9/2000 | Hwang | 455/277.2 |
| 6,296,565 B1 | * | 10/2001 | Kenkel et al. | 455/277.2 |

* cited by examiner

*Primary Examiner*—Sonny Trinh
(74) *Attorney, Agent, or Firm*—Banner & Witcoff, Ltd.

(57) ABSTRACT

A low-cost diversity antenna switching system and method is realized by controlling bias voltages on PIN diodes. By increasing the reverse bias voltage impressed upon a PIN diode, an RF signal impressed upon the diode is increasingly attenuated. As the PIN diode is forward biased to conduct in the forward direction, RF attenuation decreases. Two or more PIN diodes are used to increasingly attenuate signals from one antenna as attenuation of signals from another antenna is gradually decreased. The progression of the bias voltages is accomplished using a microprocessor that monitors a received signal strength indicator (RSSI) signal from a radio receiver. The RSSI is used to control which of two antennas are coupled into the receiver by predicting a signal fade.

41 Claims, 2 Drawing Sheets

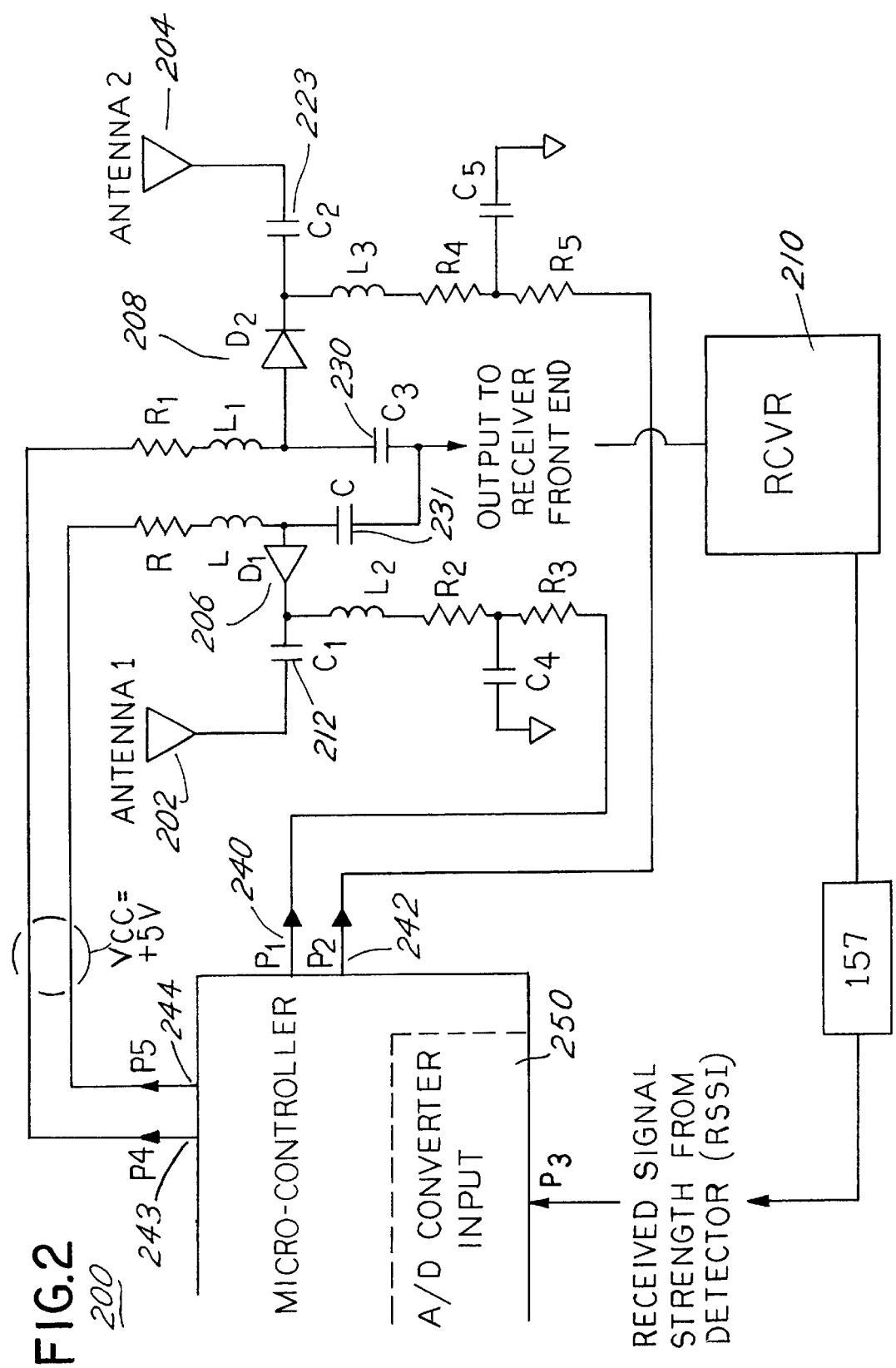

METHOD AND APPARATUS FOR PREDICTABLY SWITCHING DIVERSITY ANTENNAS ON SIGNAL DROPOUT

This is a continuation of application Ser. No. 09/304,972, filed May 4, 1999, for which priority is claimed. This parent application is incorporated herein by reference in its entirety.

FIELD OF THE INVENTION

This invention relates to diversity antenna switching systems. In particular, this invention relates to a low cost, diversity antenna switching system for use with high fidelity audio equipment.

BACKGROUND OF THE INVENTION

Diversity receiving systems and diversity antennas are well known in the communications art. In general, diversity antenna systems are used to accommodate the RF signal fading and multi-path signal propagation anomalies that are common at VHF and UHF frequencies. Signal fading and multi-path signals can adversely effect reception of a radio frequency's signal and, by selectively choosing one of two or more spatially separated antennas that pick up a signal, fading and multi-path effects can be reduced. Multiple antennas are routinely used with cellular telephones and automobile radios.

Multiple antennas are now also used with wireless microphone systems, which include a remote, low-power portable transmitter, the signals of which are received and demodulated by a receiver. As a wireless microphone is moved about a room, multi-path signals can adversely affect the demodulated audio output from the receiver because multi-path signals will produce phase anomalies in the reception process that sound like popping noise or may even cause complete audio loss. Accordingly, diversity antenna systems are now employed in such wireless microphone systems to overcome the adverse effects of multi-path and signal fading.

At least one problem with a diversity antenna system is switching the appropriate antenna to the receiver in such a way so as to seamlessly couple the receiver to the proper antenna. Prior art systems exist for selecting one, or a combination of two or more antennas to be coupled to a radio receiver. Some of these prior art systems are disclosed in U.S. Pat. No. 5,777,693 to Kishigami, et al. for a "diversity receiving apparatus for a mobile unit;" U.S. Pat. No. 5,517,686 to Kennedy, et al. for a "diversity Receiver for FM Stereo Utilizing a Pilot Tone Multiple For Phase Alignment of Received Signals;" U.S. Pat. No. 5,548,836 to Taromaru for a "Diversity Receiver;" U.S. Pat. No. 5,465,411 to Koike for a "Diversity Receiver With Switching Noise Reduction;" U.S. Pat. No. 4,293,955 to Gehr, et al. for a "Diversity Reception System;" U.S. Pat. No. 5,742,896 to Bose, et al. for a "Diversity Reception With Selector Switching at Super Audible Rate;" U.S. Pat. No. 5,697,083 to Sano for a "Diversity Receiver;" and see U.S. Pat. No. 5,603,107 to Gottfried, et al. for a "Switching System For Diversity Antenna FM Receiver."

When high fidelity audio reproduction is required in a small size package and at the lowest possible cost, prior art diversity antenna switching system are too complex, too large, or too expensive. Prior art low cost, switching systems also suffer from audio switch noise spikes that they produce in the receiver when they perform a hard instantaneous switch over from one antenna to another. A low cost, compact, method, and apparatus for selecting one or more antennas in such a way that audio fidelity reproduction is maximized would be an improvement over the prior art.

SUMMARY OF THE INVENTION

Using PIN diodes as variable RF signal attenuators, in series between each of the antennas of a diversity antenna system and the radio receiver input in a wireless microphone system, the strongest signal received from a transmitter can be seamlessly selected at the receiver without producing noise spikes caused by phase differences between the antennas. The PIN diode will conduct radio frequency energy when biased in the forward direction. By gradually biasing a PIN diode to conduct in a forward direction, its attenuation of a RF signal can be gradually increased and decreased. In a diversity antenna system, a PIN diode connected in series between the antenna and the receiver input, can be gradually forward biased, thereby gradually reducing the attenuation of RF signals passing through the diode from the antenna to the input. Simultaneously, another PIN diode connected in series with another antenna and coupled to the receiver input, can be gradually reversed biased so as to gradually attenuate signal from the other antenna.

By gradually modulating the bias current of PIN diodes, they can be used to progressively attenuate and de-attenuate signals from two or more diversity antennas that are coupled to a common summing node that is coupled to the input of the radio receiver. Signals received by one antenna can be seamlessly combined with signals from another antenna so as to avoid sudden phase shifts that can produce unacceptable audio output noise spikes.

PIN diodes are small, inexpensive and easily controlled to modulate their RF attenuation level.

BRIEF DESCRIPTION OF THE DRAWING

FIG. 2 shows a schematic diagram of an alternate embodiment of the invention.

DETAILED DESCRIPTION OF THE PREFERRED EMBODIMENT

Figure 1:
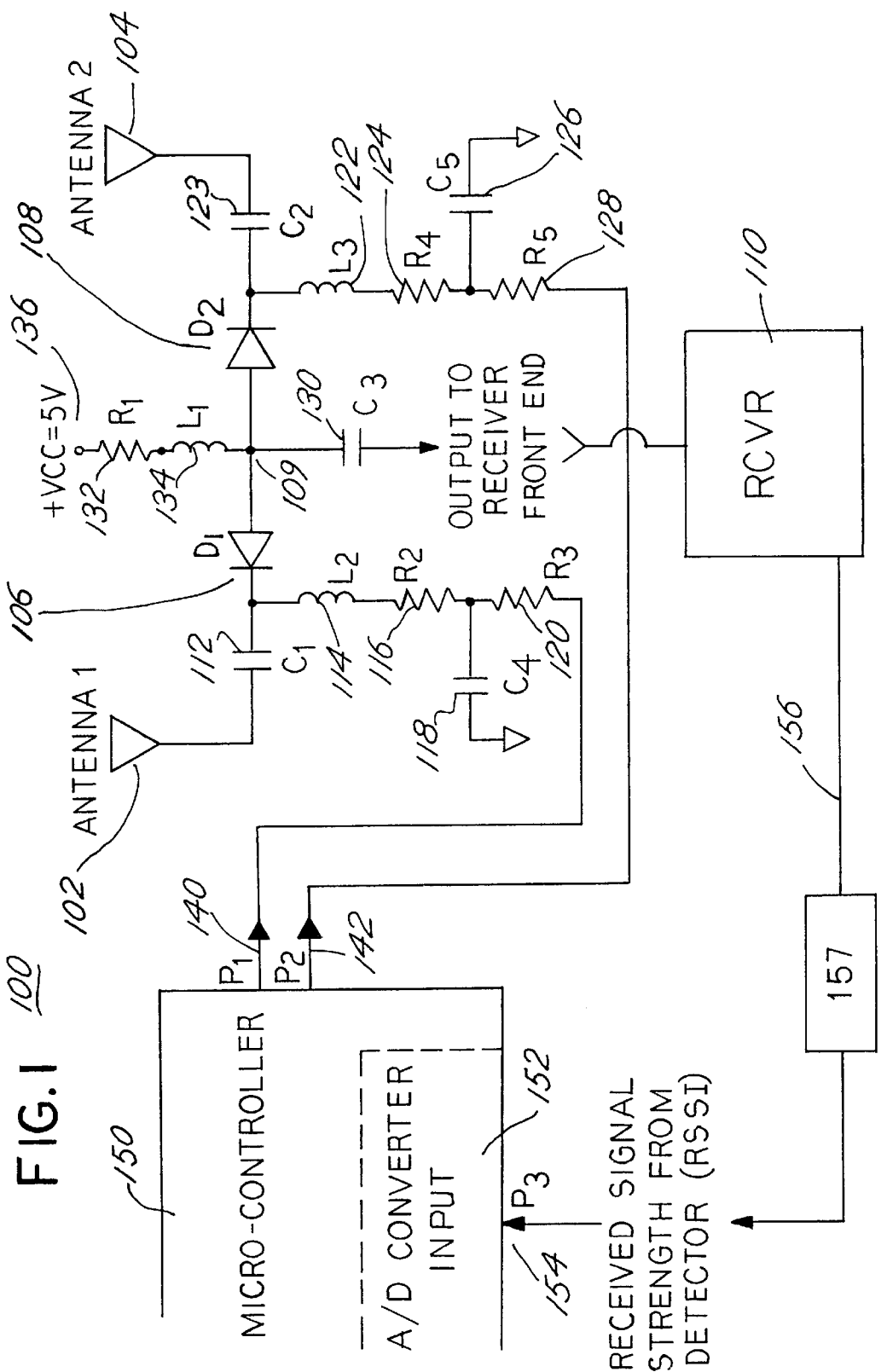
FIG. 1 shows a schematic diagram of the preferred embodiment of a diversity receiving apparatus for coupling the signals from at least one of the two antennas into the input of a receiver.

FIG. 1 shows a schematic diagram of the preferred embodiment of diversity receiving apparatus for coupling radio frequency signals from at least one antenna of a pair of such antennas into a radio receiver for demodulation. The diversity receiving apparatus 100 is comprised two radio antennas 102 and 104 for detecting signals radiated from a transmitter not shown. While the antennas 102 and 104 are only shown schematically in FIG. 1, for improving signal reception, the actual antennas are preferably spaced as far apart as practical.

The first antenna 102 is capacitively coupled 112 to the cathode of a first PIN diode 106. The anode of the first PIN diode 106 is connected to a summing node 109 that is capacitively coupled 130 to the input of a radio frequency receiver 110 which demodulates radio frequency signals picked up at antenna 102 and outputs an audio frequency signal. The second antenna 104 is also capacitively coupled 123 to the cathode of a second PIN diode 108, the anode of which is also capacitively coupled 130 to the receiver input 110. As shown in the figure, the anodes of the PIN diodes 106 and 108 are coupled to a common node 109 which is considered a summing node for the signals passing through the PIN diodes 106 and 108.

The diodes 106 and 108 act as variable RF signal level attenuators by gradually modulating bias voltages applied to these diodes. When the PIN diodes are reversed biased with a dc voltage applied to the cathodes and anodes the PIN diodes block the passage of RF signals across the PIN junction. As the diodes become forward biased, their attenuation of the RF signal decreases as the forward bias current increases eventually decreasing to substantially zero dB of attenuation when the PIN diodes are fully forward biased.

Bias voltage control of the PIN diodes is accomplished using reactive networks that are driven by voltages supplied by a microprocessor. The first PIN diode 106 is coupled to an output 140 of a micro controller 150 through a first reactive network comprised of an inductive radio frequency choke 114 in series with a resistive-capacitive network comprised of resistors 116, 120 and capacitor 118 which together form a low pass filter. The time constant of the first filter is empirically determined to switch the bias voltage applied to the cathode of the first PIN diode 106 appropriately fast or slow to accommodate the fading of signals at the antenna 102. The first PIN diode 106 is forward biased by a voltage 136 delivered to the anode of the PIN diode 106 through a current limiting resistor 132 and an RF choke 134 which are connected in series to the summing node 109 as shown. The second PIN diode 108 is controlled using a second reactive network 122, 124, 128 and 126 the components of which can preferably be matched to the component of the aforementioned first reactive network.

By virtue of the d.c. voltages impressed upon the anodes of the PIN diodes 106 and 108 by the power supply voltage 136, the PIN diodes can be controlled to variably attenuate signals coupled from the antennas 102 and 104 to the summing node 109 and subsequently to the receiver 110 by controlling the plurality of the biased voltage applied to the PIN diodes' cathode terminals. The outputs 140 and 142 of the microprocessor 150, which are normally binary-valued voltages of either 0 or 5 volts, are used to forward bias either one or both of the PIN diodes when the output voltage at pins 140 and 142 are set to zero volts.

In operation, the +5 voltage from either pin 140 and 142 will eventually charge capacitor 118 and 126 according to the time constant established by the values of resistors 120 116, 132, 124, and 128 as well as the values of capacitors 118 and 126. As the capacitors 118 and 126 charge to the output voltage from the microprocessor, the PIN diodes 106 and 108 will eventually become reversed biased attenuating radio frequency signals coupled through them to the summing node 109.

When the output of the microprocessor 150 at either pin 140 or 142 goes to a zero volt level, capacitors 118 or 126 will eventually discharge through the resistor 120 or 128 into the micro controller gradually forward biasing the respective diode 106 or 108 to a conductive state. As the PIN diode begins to conduct, its attenuation of RF signals decreases thereby de-attenuating signals received at the antennas coupled to the receiver 110.

Control of which of the two PIN diodes 106 and 108 to forward bias or reverse bias by the microprocessor 150 is determined by a received signal strength indicator signal 156, developed by an output of the receiver 110. The received signal strength indicator signal (RSSI) 156 is coupled through a low-pass anti-aliasing filter 157 to an input port 154 in the micro controller 150 into an analog to digital converter 152 preferably an included function of the microprocessor 150. In the preferred embodiment the RSSI is produced by a Philips SA626 FM IF system.

The RSSI is preferably a dc signal level the amplitude of which provides an indication of the relative signal strength of the RF signal currently being received 110 from the summing node 109. As the signal strength delivered to summing node 109 from either antenna 102 or 104 changes, the amplitude of the received signal strength indicator 156 from the receiver 110 will also vary. When the RF signal strength at the antenna 102 decreases, the received signal strength level will decrease providing an indication to the micro controller 150 that the signal strength received by the antenna 102 is beginning to fade or perhaps be destructively interfered with by a multi-path signal.

The microprocessor 150 is appropriately programmed to periodically sample the amplitude of the RSSI signal 156. The microprocessor calculates a running average level of the RSSI and monitors continuously whether this averaged signal strength is increasing or decreasing. Using empirically derived data, when the RSSI level decreases below some predetermined threshold signal level, the microprocessor 150 determines that a signal fade from the antenna 102 or 104 currently coupled to the summing node 109, is beginning. Upon the determination that a signal fade is in progress, the microprocessor 150 outputs an appropriate signal to the output pins 140 and 142 so as to begin forward biasing the PIN diode (106 or 108) of the other antenna so as to begin gradually decreasing the attenuation of that antenna thereby increasing the level of signal delivered to the summing node 109 from that antenna. After some delay the microprocessor outputs a logic one or a +5 output voltage to charge the other capacitor (118 or 126) so as to increase the reverse bias voltage on the PIN diode 108 or 106 gradually suppressing the amplitude of signal it delivered from the first or previously selected antenna to the summing node 109.

The determination of when to begin de-attenuating signals from one antenna and attenuate signals from another antenna is made by the microprocessor by converting the analog received signal strength indicator (RSSI) signal to a numerical value and arithmetically calculating a running average of this numerical value using a previously calculated average signal level value. Peak values of the average RSSI level are recorded in microprocessor 150 memory for use in calculating a threshold RSSI level that is used to determine when to begin switching antennas using the PIN diodes. This RSSI threshold level is less than the peak of the average RSSI level by an amount that is inversely proportional to the peak of the average RSSI level, and directly proportional to the dynamic range of the RSSI signal. The constants of proportionality are determined heuristically.

If the average RSSI level goes below the threshold level, the microprocessor 150 will output signals to pins 140 and 142 to de-attenuate signals from one antenna and attenuate signals from another antenna. The microprocessor will simultaneously replace the peak value of the average RSSI with the current average RSSI level and recalculate a new threshold level. The threshold level is also dynamically adjusted by changes in the peak value of the average RSSI.

When RF signal levels at the receiver are strong, the diversity antennas need to be switched to prevent multi-path signals from destructively combining and adversely affecting audio quality of the demodulated signals. When RF signal levels at the receiver weaken, the diversity antennas should be switched to prevent the receiver from going into squelch. At very low signal levels, no antenna switch should be made. Determining when to switch antennas using the PIN diodes is accomplished using a running average of the RSSI and a historical peak running average RSSI value.

The received signal strength indicator (RSSI) is an output from a receiver and is proportional to the strength of the RF signal at the antenna receiving the signal. In the preferred embodiment, the RSSI can vary from zero volts to +5 volts D.C. The RSSI is input 154 to an analog-to-digital converter (A/D) within the microprocessor 150 and converted to an 8-bit binary word having decimal values from 0–255. The microprocessor 150 stores the first such value, which in the preferred embodiment is named both "A2D_BESTVALUE" and "A2D_AVERAGE".

A running average of the digitized RSSI (after conversion to a digital form by the AID) is continuously calculated by continuously re-reading the digitized RSSI and adding the most-recently read RSSI value latest to the previously stored A2D_AVERAGE and dividing their sum by 2. The resultant average RSSI is stored as A2D_AVERAGE. Whenever the A2D_AVERAGE exceeds the value stored in A2D_BESTVALUE, A2D_AVERAGE is copied into A2D_BESTVALUE as a new value for A2D_BESTVALUE.

The A/D converter samples the RSSI, and its output is used to calculate a new A2D_AVERAGE once every 0.5 milliseconds corresponding to the A/D sampling rate. This rate was chosen to provide an optimum rate of change of A2D_AVERAGE. In a real-world environment, as A2D_AVERAGE declines below an empirically determined threshold value, the microprocessor will begin the antenna switch-over. The threshold for switching antennas is expressed by equation 1:

$$A2D\_BESTVALUE - A2D\_AVERAGE > (No\_RF\_LEVEL + SAT\_LEVEL - A2D\_BESTVALUE) \cdot X \quad (1)$$

Where:
"No_RF_LEVEL"=RSSI level from the FM detector with no RF signal input to the receiver;
"SAT_LEVEL"=RSSI maximum value, i.e. stronger RF signal levels to the receiver will not produce a greater RSSI value;
"X" is determined by equation 2:

$$(No\_RF\_LEVEL + SAT\_LEVEL - A2D\_BESTVALUE) \cdot X = 1/Y \cdot (SAT\_LEVEL - NO\_RF\_LEVEL) \text{ When } SAT\_LEVEL = A2D\_BESTVALUE \quad (2)$$

Where "Y" is a constant and is set to provide the appropriate switching level resolution. For the preferred embodiment, Y=8; SAT_LEVEL=5.3 v.d.c.; NO_RF_LEVEL=1.25 v.d.c.

Substituting these values into equation 2 and letting A2D_BESTVALUE=SAT_LEVEL gives:

$$(1.25v) \cdot X = \frac{1}{8} \cdot (5.3v - 1.25v)$$

from which X can be determined to be equal to 0.405.

Substituting the values of X into equation 1 gives:

$$A2D\_BESTVALUE - A2D\_AVERAGE > (1.25v + 5.3v - A2D\_BESTVALUE) \cdot 0.405 \quad (3)$$

Where the right side of equation 3 is the switching threshold and is dynamically adjusted by the current value of A2D_BESTVALUE.

In operation, as a signal fade begins, as indicated by the received signal strength indicator 156, the microprocessor can begin to couple the other antenna to the summing node 109 and after some delay begin decreasing the signal from the fading signal delivered to other antenna so as to provide a nearly seamless transition from one antenna to the other. Unlike prior art diversity antenna switching systems, the method and apparatus disclosed herein does not produce the audio signal anomalies from the output of the receiver 110 associated with hard switching of one antenna to another.

While the embodiment shown in FIG. 1 depicts the use of reactive networks to produce a gradual biased voltage change to the PIN diodes 106 and 108 alternate embodiments of the invention would include directly coupling the cathodes of the PIN diodes 106 and 108 to a digital to analog converter that is coupled to the microprocessor 150 outputs. In such an embodiment, the microprocessor could output a digital representation of a desired bias voltage for the cathodes of the PIN diodes and directly control, in real time, the bias voltage applied to the cathodes (or anodes) of the PIN diodes. Such an embodiment would provide more close control of the PIN diode biasing but at an increased parts cost. Reactive networks provide a low cost physically compact means by which the biased voltages of the PIN diodes can be controlled using the micro controller outputs directly.

Still other embodiments of the invention would include reversing the polarity or orientation of the PIN diodes 106 and 108 from that shown in FIG. 1. Stated alternately, the cathodes of the PIN diodes could be coupled to the summing node 109 and forward biased (by either the reactive networks or the output of a D/A) if the summing node were coupled to ground potential, i.e. zero volts. A +5-volt output voltage from the micro controller 150 to terminals 140 or 142 would thereby forward bias the PIN diodes decreasing their attenuation.

Instead of using PIN diodes, still other alternate embodiments of the invention would include the use of gallium arsenide field effect transistors instead of PIN diodes 106 and 108. By appropriately biasing gallium arsenide field effect transistors, they also can function as first and second variable RF signal level attenuators. Still other variable RF attenuators would include bipolar junction transistors which by appropriate bias voltages applied to the base terminals thereof can be employed to increase or decrease RF signal levels passing through them to the summing node 109.

The PIN diodes used in the preferred embodiment are, of course, two-terminal devices and as shown in the topology of FIG. 1 the devices anode's are common. The PIN diode anodes can be considered the first terminals of such diodes. The PIN diode cathodes are considered to be the second terminal of the diodes.

One skilled in the art will recognize that the PIN diodes begin to conduct in the forward direction and become forward biased when the voltage measured from the anode to the cathode is greater than zero volts and that the forward bias current will increase as the forward bias voltage increases. The time constants of the RC networks (132, 120, 116, 118, 128, 124 and 126) affect the rates of which the biased condition of the PIN diodes change. By increasing the time constant of the RC networks the transition time of switching received signal from one antenna to the other is increased. By increasing these time constants the switching time of the system becomes more susceptible to the complete signal dropout from one or both of the antennas. Alternatively, by shortening the time constants excessively the PIN diodes will more abruptly attenuate signal from one antenna and more abruptly couple signal from the other antenna to the summing node. The appropriate time constants need to be empirically determined to accommodate signal fade rate in the intended environment of operation of the apparatus depicted in FIG. 1.

An alternate embodiment of the invention is depicted in FIG. 2. In this embodiment 200, RF attenuating PIN diodes 206 and 208 are not connected to a common summing node.

A first antenna 202 is capacitively coupled 212 to a first PIN diode 206. A second antenna 204 is capacitively coupled 223 to a second PIN diode 208. Bias voltages applied to both the anodes and the cathodes of the PIN diodes 206 and 208 are obtained from the microprocessor 250 through output ports 240, 242, 243 and 244 of the microprocessor 250. Each PIN diode 206 and 208 is capacitively coupled, 231 and 230 respectively, to the input of a radio receiver 210.

Instead of connecting one terminal of each of the PIN diodes to a summing node, as depicted in FIG. 1, which is then connected to the input of a radio receiver, in the embodiment shown in FIG. 2, the bias voltages applied to the PIN diodes of FIG. 2 are generated by other circuitry, namely the microprocessor 250. Still other embodiments would include generating bias voltages by other circuits, including additional, dedicated processors.

In the embodiment shown in FIG. 2, the voltages impressed upon both anodes and cathodes of the PIN diodes are controlled by the microprocessor. Such an implementation requires that there be a sufficient number of outputs from the processor 250 and that the voltages applied to the PIN diodes be adjusted in magnitude and polarity so as to be able to appropriately adjust the attenuation of the corresponding device. By appropriately controlling the polarity of the bias voltages impressed upon the diodes as shown in FIG. 2, the orientation or polarity of the diodes can of course be reversed while retaining the functionality of the circuit as a diversity antenna switch.

As shown in FIG. 2, variable voltages are applied to the diodes at the nodes coupled to the antennas and fixed voltages are applied to the diodes on the opposite side of the diodes' junctions. Another alternate embodiment would of course include applying variable voltages to the nodes of the diodes opposite the antenna and fixed voltages applied to the nodes of the diodes coupled to the antennas.

Still other embodiments of the invention would include using more than two antennas which would of course entail using additional PIN diodes and reactive networks to control the biased voltages thereof. Alternate embodiments of the invention would include three, four or more antennas coupled to a summing node 109 the corresponding PIN diodes of which could be controlled by a resitive-capacitive reactive networks controlled by individual outputs for the micro controller 150. Such an alternate embodiment of more than two antennas might also be configured to apply bias voltages using the technique depicted in FIG. 2, i.e. that multiple antennas do not necessarily need to share a common summing node.

I have disclosed a low cost, physically compact diversity antenna switching system and methodology which can be used to input to a receiver, signals from at least one of several antennas which is selected according to the level of a signal representative of a signal fade (RSSI). As a signal fade begins, another antenna can be seamlessly selected to possibly preclude complete signal dropout and audio signal output loss by changing the bias voltage on PIN diodes that act as variable RF signal level attenuators.

What is claimed is:

1. A diversity receiving apparatus for coupling signals from at least one antenna of at least first and second antennas to a radio receiver, said diversity receiving apparatus comprised of:
    a) a first variable, RF signal level attenuator having an input coupled to receive RF signals from said first antenna and having an output coupled to a RF signal summing node;
    b) a second variable, RF signal level attenuator having an input coupled to receive RF signals from said second antenna and having an output coupled to said RF signal summing node;
    c) a first resistive-capacitive network coupled to said first RF signal level attenuator to supply a variable voltage to said first variable RF signal level attenuator;
    d) a second resistive-capacitive network coupled to said second RF signal level attenuator to supply a variable voltage to said second variable RF signal level attenuator;
    e) at least one variable RF signal level attenuator controller, coupled to at least said first resistive-capacitive network so as to control attenuation levels of at least one of said RF signal level attenuators;

whereby RF signals received at said first and second antennas and coupled to said RF summing node can be selectively coupled to said radio receiver by controlling at least said first variable RF signal level attenuator and said first resistive-capacitive network.

2. The diversity receiving apparatus of claim 1 wherein said first and second variable RF signal level attenuators are PIN diodes.

3. The diversity receiving apparatus of claim 1 wherein said first and second variable RF signal level attenuators are gallium arsenide field-effect transistors.

4. The diversity receiving apparatus of claim 1 wherein said first and second variable RF signal level attenuators are bipolar junction transistors.

5. The diversity receiving apparatus of claim 1 wherein said at least one variable RF signal level attenuator controller is comprised of a reactive network.

6. The diversity receiving apparatus of claim 1 wherein said at least one variable RF signal level attenuator controller is an R-C circuit.

7. The diversity receiving apparatus of claim 1 wherein said at least one variable RF signal level attenuator controller includes a microprocessor.

8. The diversity receiving apparatus of claim 1 further including an RE signal level attenuator controller coupled to said second resistive-capacitive network.

9. The diversity receiving apparatus of claim 1 wherein said variable RF signal level attenuator controller is a microprocessor providing an analog output voltage.

10. The diversity receiving apparatus of claim 1 wherein said microprocessor includes a microprocessor that acts to de-attenuate signals from said second antenna prior to attenuating signals from said first antenna.

11. The diversity receiving apparatus of claim 1 wherein a signal level of said signal from said first antenna is indicated by a relative signal strength indicator of radio signal strength generated by said radio receiver.

12. The diversity receiving apparatus of claim 1 wherein a signal level of said signal from said first antenna is shown by a signal indicating noise levels of audio signals demodulated from RE signals detected by said radio receiver.

13. The diversity receiving apparatus of claim 1 wherein said RF signal summing node is coupled to a radio receiver input.

14. A diversity receiving method for coupling signals from at least one antenna of at least first and second antennas to a radio receiver, said diversity receiving method comprising the steps of:
    a) using a first variable, RF signal level attenuator having an input coupled to receive RF signals from said first antenna and an output to provide said RE signals to a radio receiver input;
    b) using a second variable, RF signal level attenuator having an input coupled to receive RF signals from said second antenna and an output to provide said RF signals to a radio receiver input;

c) using a first resistive-capacitive network coupled to said first RF signal level attenuator to supply a voltage to said first variable RF signal level attenuator;

d) using a second resistive-capacitive network coupled to a second RF signal level attenuator to supply a voltage to said second variable RF signal level attenuator;

e) using at least one variable RF signal level attenuator controller, coupled to at least said first variable attenuator so as to control attenuation levels of said at least one variable RF signal level attenuator;

whereby RF signals received by said first and second antennas can be selectively coupled to said radio receiver input by controlling at least said first variable RF signal level attenuator to thereby control the level at which the signals from the first and second antennas are summed.

15. The diversity receiving method of claim 14 wherein said first and second variable RF signal level attenuators are PIN diodes.

16. The diversity receiving method of claim 14 wherein said first and second variable RF signal level attenuators are gallium arsenide field-effect transistors.

17. The diversity receiving method of claim 14 wherein said first and second variable RF signal level attenuators are bipolar junction transistors.

18. The diversity receiving method of claim 14 wherein said at least one variable RF signal attenuator controller is comprised of a reactive network.

19. The diversity receiving method of claim 14 wherein said at least one variable RF signal level attenuator controller is an R-C circuit.

20. The diversity receiving method of claim 14 wherein said at least one variable RF signal level attenuator controller includes a microprocessor.

21. The diversity receiving method of claim 14 further including an RF signal level attenuator controller coupled to said second variable RF signal level attenuator.

22. The diversity receiving method of claim 14 wherein said at least one variable RF signal attenuator controller is a microprocessor providing an analog output voltage.

23. The diversity receiving method of claim 14 wherein said attenuator controller includes a microprocessor that de-attenuates signals from said second antenna prior to attenuating signals from said first antenna.

24. The diversity receiving method of claim 14 wherein a signal level of said signal from said first antenna is indicated by a relative signal strength indicator of radio signal strength generated by said radio receiver.

25. The diversity receiving method of claim 14 wherein a signal level of said signal from said first antenna is shown by a signal indicating noise levels of audio signals demodulated from RF signals detected by said radio receiver.

26. A diversity receiving apparatus for coupling signals from at least one antenna of at least first and second antennas to a radio receiver, said diversity receiving apparatus comprised of:

a) a first variable, RF signal level attenuator having an input coupled to receive RF signals from said first antenna and having an output coupled to a RF signal summing node;

b) a second variable, RF signal level attenuator having an input coupled to receive RF signals from said second antenna and having an output coupled to said RF signal summing node;

c) a microprocessor controller, coupled to at least said first variable attenuator so as to control attenuation levels of said RF signal level attenuators and monitor signal levels provided by at least said first antenna such that when an average of said signal levels from said antenna drops below a predetermined threshold signal level, said microprocessor supplies a control voltage to first and second reactive networks to increase attenuation of signal delivered to said summing node from said first antenna and to decrease attenuation of the signal delivered to said summing node from said second antenna;

whereby RF signals received at said first and second antennas and coupled to said RF summing node can be selectively coupled to said radio receiver by controlling at least said first variable RF signal level attenuator.

27. The diversity receiving apparatus of claim 26 wherein said first and second variable RF signal level attenuators are PIN diodes.

28. The diversity receiving apparatus of claim 26 wherein said first and second variable RF signal level attenuators are gallium arsenide field-effect transistors.

29. The diversity receiving apparatus of claim 26 wherein said first and second variable RF signal level attenuators are bipolar junction transistors.

30. The diversity receiving apparatus of claim 26 wherein a signal level of said signal from said first antenna is indicated by a relative signal strength indicator of radio signal strength generated by said radio receiver.

31. The diversity receiving apparatus of claim 26 wherein a signal level of said signal from said first antenna is shown by a signal indicating noise levels of audio signals demodulated from RF signals detected by said radio receiver.

32. The diversity receiving apparatus of claim 26 wherein said RF signal summing node is coupled to a radio receiver input.

33. A diversity receiving method for coupling signals from at least one antenna of at least first and second antennas to a radio receiver, said diversity receiving method comprising the steps of:

a) using a first variable, RF signal level attenuator having an input coupled to receive RF signals from said first antenna to couple said RF signals to a radio receiver input;

b) using a second variable, RF signal level attenuator having an input coupled to receive RF signals from said second antenna to couple said RF signal signals to a radio receiver input;

c) using a microprocessor controller, coupled to at least said first variable attenuator so as to control attenuation levels of at least one variable RF signal level attenuator;

d) using a microprocessor controller, coupled to at least said first variable attenuator so as to control attenuation levels of said RF signal level attenuators and monitor signal levels provided by at least said first antenna such that when an average of said signal levels from said antenna drops below a predetermined threshold signal level, said microprocessor supplies a control voltage to first and second reactive networks to increase attenuation of signal delivered to said summing node from said first antenna and to decrease attenuation of the signal delivered to said summing node from said second antenna;

whereby RF signals received by at said first and second antennas can be selectively coupled to said radio receiver input by controlling at least said first variable RF signal level attenuator.

34. The diversity receiving method of claim 33 wherein said first and second variable RF signal level attenuators are PIN diodes.

35. The diversity receiving method of claim 33 wherein said first and second variable RF signal level attenuators are gallium arsenide field-effect transistors.

36. The diversity receiving method of claim 33 wherein said first and second variable RF signal level attenuators are bipolar junction transistors.

37. The diversity receiving method of claim 33 wherein said microprocessor includes a microprocessor that de-attenuates signals from said second antenna prior to attenuating signals from said first antenna.

38. The diversity receiving method of claim 33 wherein a signal level of said signal from said first antenna is indicated by a relative signal strength indicator of radio signal strength generated by said radio receiver.

39. The diversity receiving method of claim 33 wherein a signal level of said signal from said first antenna is shown by a signal indicating noise levels of audio signals demodulated from RF signals detected by said radio receiver.

40. A method for receiving and coupling signals from at least two antennas to a radio receiver, the method comprising the steps of:

a) receiving the RF signal from a first antenna;

b) receiving the RF signal from a second antenna;

c) attenuating, if necessary, the RF signal received from at least the first antenna to form a first attenuated signal;

d) summing the attenuated signal and the RF signal received from the second antenna;

e) controlling an attenuation level of the RF signal received level from at least the first antenna, wherein a signal level of the received RF signal from the first antenna is monitored such that when the signal level drops below a predetermined threshold signal level, the RF signal received from the first antenna is further attenuated, whereby RF signals received by at the first and second antennas can be selectively coupled to the radio receiver input by controlling a signal level of at least the RF signal received by the first antenna.

41. A diversity receiving method for coupling RF signals from at least two antennas to a radio receiver, said diversity receiving method comprising the steps of:

a) receiving the RF signal from a first antenna;

b) receiving the RF signal from a second antenna;

c) attenuating, if necessary, the RF signal received from at least the first and second antennas to form first and second attenuated signals, respectively;

d) summing the first and second attenuated signal and providing the summed signal to a radio receiver input; and e) controlling an attenuation level of the RF signals received level from at least the first and second antennas, wherein a signal level of the received RF signal from the first and second antennas is monitored such that when one of the signal level drops below a predetermined threshold signal level, the RF signal received from the corresponding antenna is further attenuated and attenuation of the RF signal received from any other antenna is decreased, whereby RF signals received by at the first and second antennas can be selectively coupled to the radio receiver input by controlling a signal level of at least the RF signal received by the first antenna.

* * * * *